(12) United States Patent
Mangialardi

(10) Patent No.: US 11,560,677 B2
(45) Date of Patent: Jan. 24, 2023

(54) COMPLIANCE METHOD AND SYSTEM FOR TRAFFIC CONTROL DEVICES

(71) Applicant: STRADA SIGN SUPPLY INC., Markham (CA)

(72) Inventor: Dominic Mangialardi, Markham (CA)

(73) Assignee: SMART INFRASTRUCTURE MAINTENANCE APPLICATIONS INC., Markam (CA)

( * ) Notice: Subject to any disclaimer, the term of this patent is extended or adjusted under 35 U.S.C. 154(b) by 1494 days.

(21) Appl. No.: 15/568,306

(22) PCT Filed: Apr. 22, 2016

(86) PCT No.: PCT/CA2016/000125
§ 371 (c)(1),
(2) Date: Oct. 20, 2017

(87) PCT Pub. No.: WO2016/168915
PCT Pub. Date: Oct. 27, 2016

(65) Prior Publication Data
US 2018/0179712 A1   Jun. 28, 2018

Related U.S. Application Data

(60) Provisional application No. 62/151,397, filed on Apr. 22, 2015.

(51) Int. Cl.
*E01F 9/619* (2016.01)
*G09F 13/16* (2006.01)
(Continued)

(52) U.S. Cl.
CPC ............ *E01F 9/619* (2016.02); *E01F 9/30* (2016.02); *G06K 19/07722* (2013.01);
(Continued)

(58) Field of Classification Search
CPC ........ E01F 9/619; E01F 9/512; G09F 13/0472
See application file for complete search history.

(56) References Cited

U.S. PATENT DOCUMENTS

| 5,175,646 A | 12/1992 | Eden |
| 8,737,915 B2 * | 5/2014 | Beenken .......... G06K 19/07783 455/41.3 |

(Continued)

FOREIGN PATENT DOCUMENTS

| CA | 2839262 A1 | 12/2012 |
| CN | 102201161 B | 6/2015 |

(Continued)

OTHER PUBLICATIONS

Supplemental European Search Report—EP Appln. No. 16782412, 14 pages.

(Continued)

*Primary Examiner* — Qutbuddin Ghulamali
(74) *Attorney, Agent, or Firm* — Dinsmore & Shohl LLP

(57) ABSTRACT

A sign comprising a substrate having a planar sign face and an opposing planar back face having peripheral side edges; a recessed portion formed within said substrate having an opening and a bottom, and side walls; a RFID tag assembly having a metal shielding sheet, said RFID tag assembly having a mounting substrate, a double-sided adhesive sheet with one side adhered to a metal shielding sheet and an opposing side adhered to said bottom of said recessed portion; a retroreflective sheeting having a double-sided pressure-sensitive adhesive sheeting for application over said RFID tag assembly to hermetically seal said RFID tag assembly within said recessed portion; a translucent vinyl backed material with primary indicia applied to said retroreflective sheeting; and a label with secondary indicia applied to said back face via label adhesive.

8 Claims, 9 Drawing Sheets

(51) Int. Cl.
*G06Q 10/08* (2012.01)
*G08G 1/097* (2006.01)
*G08G 1/01* (2006.01)
*E01F 9/30* (2016.01)
*G06K 19/077* (2006.01)
*G09F 13/04* (2006.01)

(52) U.S. Cl.
CPC ......... *G06Q 10/087* (2013.01); *G08G 1/0116* (2013.01); *G08G 1/0129* (2013.01); *G08G 1/097* (2013.01); *G09F 13/16* (2013.01); *G09F 13/0472* (2021.05)

(56) References Cited

U.S. PATENT DOCUMENTS

| | | |
|---|---|---|
| 2008/0258875 A1 | 10/2008 | Jesme et al. |
| 2009/0102653 A1* | 4/2009 | McGinnis ............ G06Q 10/087 705/28 |
| 2009/0124303 A1* | 5/2009 | Twitchell, Jr. ........ H04W 84/18 455/574 |
| 2011/0209367 A1 | 9/2011 | Li et al. |
| 2012/0320204 A1 | 12/2012 | Dahlin |
| 2014/0217182 A1 | 8/2014 | Beenken |
| 2014/0366411 A1* | 12/2014 | Sirosaki ............ G06K 7/10009 40/208 |

FOREIGN PATENT DOCUMENTS

| | | |
|---|---|---|
| EP | 2280296 A2 | 2/2011 |
| GB | 2255313 A | 4/1992 |
| WO | 9635196 A1 | 11/1996 |

OTHER PUBLICATIONS

Extended European Search Report—EP Appln. No. 16782412.7, 17 pages.
International Search Report—PCT/CA2016/000125; Filing Date Apr. 22, 2016; 8 pages.

* cited by examiner

COMPLIANCE METHOD AND SYSTEM FOR TRAFFIC CONTROL DEVICES

FIELD OF THE INVENTION

The present invention relates to traffic control devices, more particularly it relates to methods and systems for authenticating, managing and monitoring traffic control devices and maintenance thereof.

DESCRIPTION OF THE RELATED ART

Traffic signs are a vital component of road safety and traffic efficiency. A major concern of transportation agencies throughout the world is to develop a method to effectively and efficiently maintain roadway signage infrastructure. However, maintaining traffic signs is becoming increasingly difficult for agencies faced with budget constraints, growing traffic congestion and new federal standards establishing minimum reflectivity performance requirements.

The "Traffic Control Devices Handbook", hereinafter referred to as the "Handbook", 1983 edition, published by the U.S. Department of Transport under the Federal Highway Administration, places traffic signs in three categories: regulatory; warning and guide signs. Regulatory signs (e.g. Stop sign) inform drivers of traffic laws and regulations; warning signs (e.g. Curve Ahead sign) alert drivers to traffic of unusual or potentially hazardous conditions on or adjacent a street or highway; and guide signs give drivers specific information to assist with wayfinding and navigation. In all categories however, particularly in the regulatory and warning categories, the signs convey only one traffic message, and no secondary traffic message or information is imparted by the signs. Traffic signs may include but are not limited to: Checkerboard; Curve sign with advisory speed tab; Do Not Enter; Load Restricted Bridge; Low Bridge; Low Bridge Ahead; One Way; Stop; Stop Ahead; Stop Ahead; Traffic Signal Ahead; Two-Way Traffic Ahead; Wrong Way; Yield; Yield Ahead; Yield Ahead and New. Other signs include school signs such as: School Zone Ahead; School Zone Speed Limit; End School Zone; and emergency management and civil defense signs such as: Emergency Shelter; Hurricane Shelter; Hurricane Evacuation Route; Traffic Control Point; Area Closed.

The traffic signs are generally made from metal blanks and include retroreflective material for nighttime visibility of the traffic message or symbol. However, with the passage of time, due to a breakdown in the pigments or reflective material in the sheeting material, these signs generally degrade and become less retroreflective, and their effectiveness in communicating regulatory, warning, and guidance messages to road users at nighttime diminishes to the point when the signs can not be deciphered or read in time for a driver to react properly. Thus, to maintain nighttime effectiveness and remain compliant with the maintenance standards set by governing bodies, signs are required to be replaced before they reach the end of their useful retroreflective life. For example, ONTARIO REGULATION 239/02 of the Municipal Act sets out the minimum maintenance standards for municipal highways, and mandates one inspection per calendar year to verify and record whether the regulatory signs or warning signs meet the retro-reflectivity requirements of the Ontario Traffic Manual. Any sign that is illegible, improperly oriented, obscured, or missing, must be repaired or replaced expeditiously.

Replacement of signs is typically based on evaluation or management methods. Evaluation methods involve some type of assessment of the nighttime visibility of individual signs (e.g., visual inspection or retro-reflectivity measurement); whereas management methods are based on the expected retroreflective life of the overall sign inventory, and based on factors such as warranties, demonstrated performance, or control sign assessments. Assessment of the nighttime visibility of individual signs involves a formal visual inspection procedure by a trained inspector from a moving vehicle during nighttime conditions. Signs that are visually identified by the inspector to have retro-reflectivity below the minimum levels are slated for replacement. In another method, sign retro-reflectivity is measured using a retro-reflectometer, and signs with retro-reflectivity below the minimum levels are slated for replacement. In yet another method, the age of the sign (based on the installation date) is compared to the expected sign life (based on the historical data of sign retro-reflectivity degradation in a geographic area), and signs older than the expected life are slated for replacement. Another method involves a blanket replacement of all signs in an area or corridor, or signs of a given type at specified intervals. This method eliminates the need to assess retro-reflectivity or track the life of individual signs. The replacement interval is based on the expected sign life of the sign material in a particular geographical location, or based with the shortest life of the sign material on a given sign type.

In addition, the increase in liability lawsuits related to the condition and placement of traffic signs underscores the importance of ensuring that signs are maintained in a desirable condition. Accordingly, various sign management systems have been proposed, and most of these systems rely on paper-based reporting, organizing, and storage methods. Other sign management systems keep track of signs by manually scanning barcodes affixed to signs, and storing the barcode information in a database for use with conventional asset management software. However, the durability of these barcodes is substantially reduced due to the weather conditions, and readability is affected by dirt, mud, snow or ice, notwithstanding the requirement for line-of-sight reading. Accordingly, bar code technology may be relatively unreliable.

Other systems employ vehicle-mounted camera systems which record video along a selected route to capture signs, and the captured video data is then painstakingly analyzed. These systems are associated with relatively high operational costs, as each vehicle includes at least one driver, an inspector, camera units, and control, recording, playback, and processing units. Yet another system is based on global positioning systems (GPS) to locate signs, however, such systems suffer from decreased accuracy.

It is an object of the present invention to mitigate or obviate at least one of the above-mentioned disadvantages.

SUMMARY OF THE INVENTION

In one of its aspects, there is provided a sign comprising:
a substrate having a planar sign face and an opposing planar back face having peripheral side edges;
a recessed portion formed within said substrate having an opening and a bottom, and side walls;
a RFID tag assembly having a metal shielding sheet, said RFID tag assembly having a mounting substrate, a double-sided adhesive sheet with one side adhered to a metal shielding sheet and an opposing side adhered to said bottom of said recessed portion;
a retroreflective sheeting having a double-sided pressure-sensitive adhesive sheeting for application over said RFID tag assembly to hermetically seal said RFID tag assembly within said recessed portion; and a translucent vinyl backed material with primary indicia applied to said retroreflective sheeting.

In yet another aspect, there is provided a compliance system for traffic control devices, the system comprising:

each of said traffic control devices having an RFID tag associated with a unique tag identifier and a unique traffic control device identifier;

a database for storing a record pertaining to attributes of each of said traffic control devices, wherein said record is associated with at least one of a unique tag identifier and a unique traffic control device identifier;

a compliance module comprising instructions stored in memory and executable by a processing structure to cause said processing structure to at least:

determine the age of each of said traffic control devices;

determine the condition of each of said traffic control devices based on predetermined criteria and maintenance data associated with each of said traffic control devices; and establish a compliance risk assessment for each of said traffic control devices based on regulatory requirements, and then based on said compliance risk assessment, generate a recommendation and/or action to be taken to comply with said regulatory requirements.

In yet another aspect, there is provided a compliance method for traffic control devices, the method comprising the steps of:

receiving a unique RFID tag identifier associated with each of said traffic control devices;

querying a compliance database having records associated with each of said traffic control devices corresponding to said unique RFID tag identifier;

determining an age of each of said traffic control devices and condition of each of said traffic control devices based on predetermined criteria and maintenance data associated with each of said traffic control devices;

establishing a compliance risk assessment for each of said traffic control devices based on regulatory requirements; and based on said compliance risk assessment, generating a recommendation and/or action to be taken to comply with said regulatory requirements.

In yet another aspect, there is provided a sign comprising:

a substrate having a planar sign face and an opposing planar back face having peripheral side edges;

a recessed portion formed within said substrate;

contained within said recessed portion at least one of a RFID tag assembly, an accelerometer; a global positioning system (GPS) sensor; processing circuitry comprising, a microprocessor and a computer readable medium, a communications interface module with a transceiver for emitting radio signals, and for receiving radio signals, a power unit;

a retroreflective sheeting for application over said recessed portion; and a translucent vinyl backed material with primary indicia applied to said retroreflective sheeting.

Advantageously, the compliance system identifies and authenticates each item individually, increases inventory efficiency, reduces data errors, and mitigates liability issues.

BRIEF DESCRIPTION OF THE DRAWINGS

Several exemplary embodiments of the present invention will now be described, by way of example only, with reference to the appended drawings in which.

DETAILED DESCRIPTION OF EXEMPLARY EMBODIMENTS

The detailed description of exemplary embodiments of the invention herein makes reference to the accompanying block diagrams and schematic diagrams, which show the exemplary embodiment by way of illustration. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

Moreover, it should be appreciated that the particular implementations shown and described herein are illustrative of the invention and its best mode and are not intended to otherwise limit the scope of the embodiments of the invention in any way. Indeed, for the sake of brevity, certain sub-components of the individual operating components, conventional data networking, application development and other functional aspects of the systems may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

Figure 1:
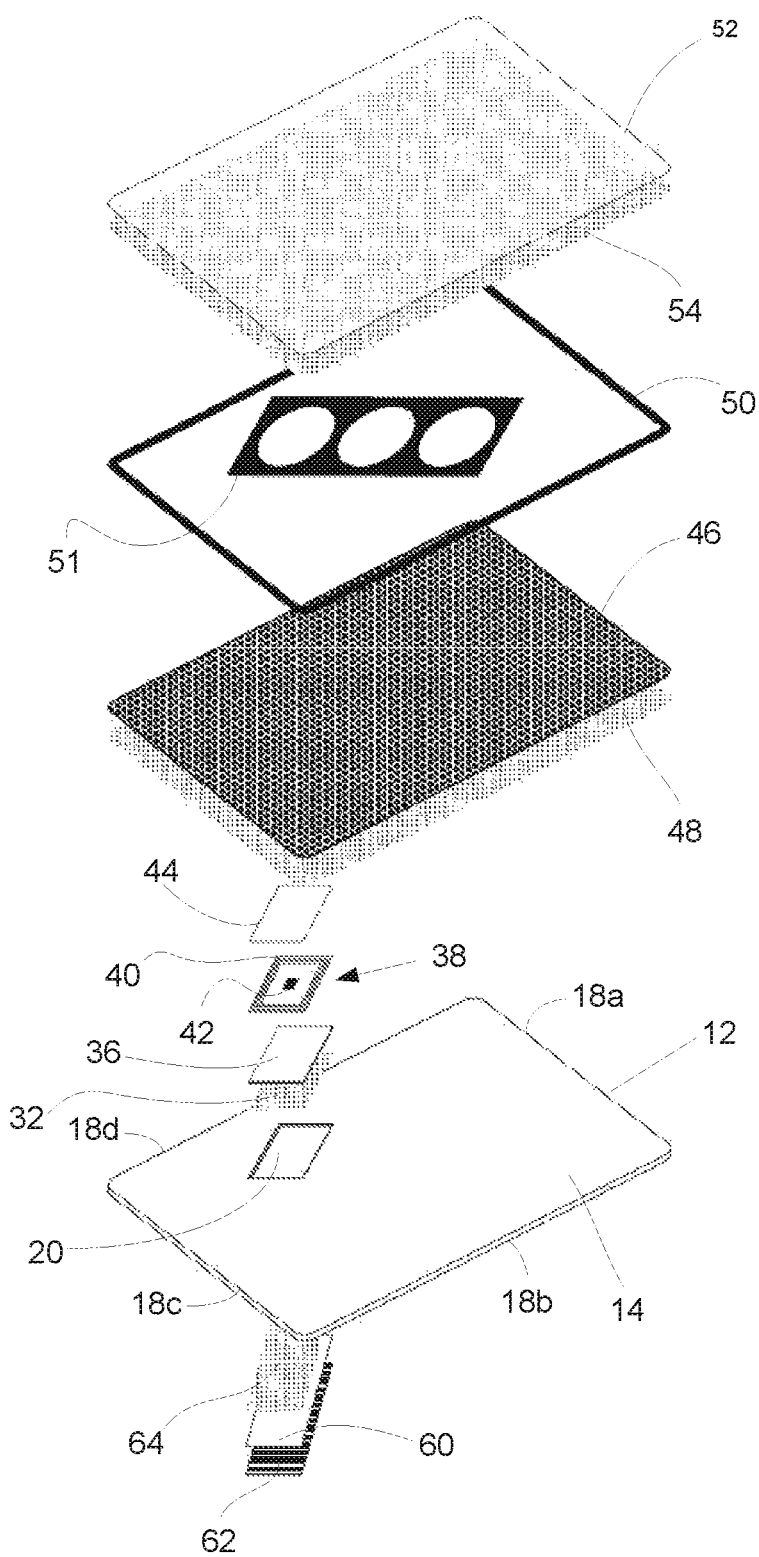
FIG. 1 shows an exploded view of an exemplary road sign.
Figure 2:
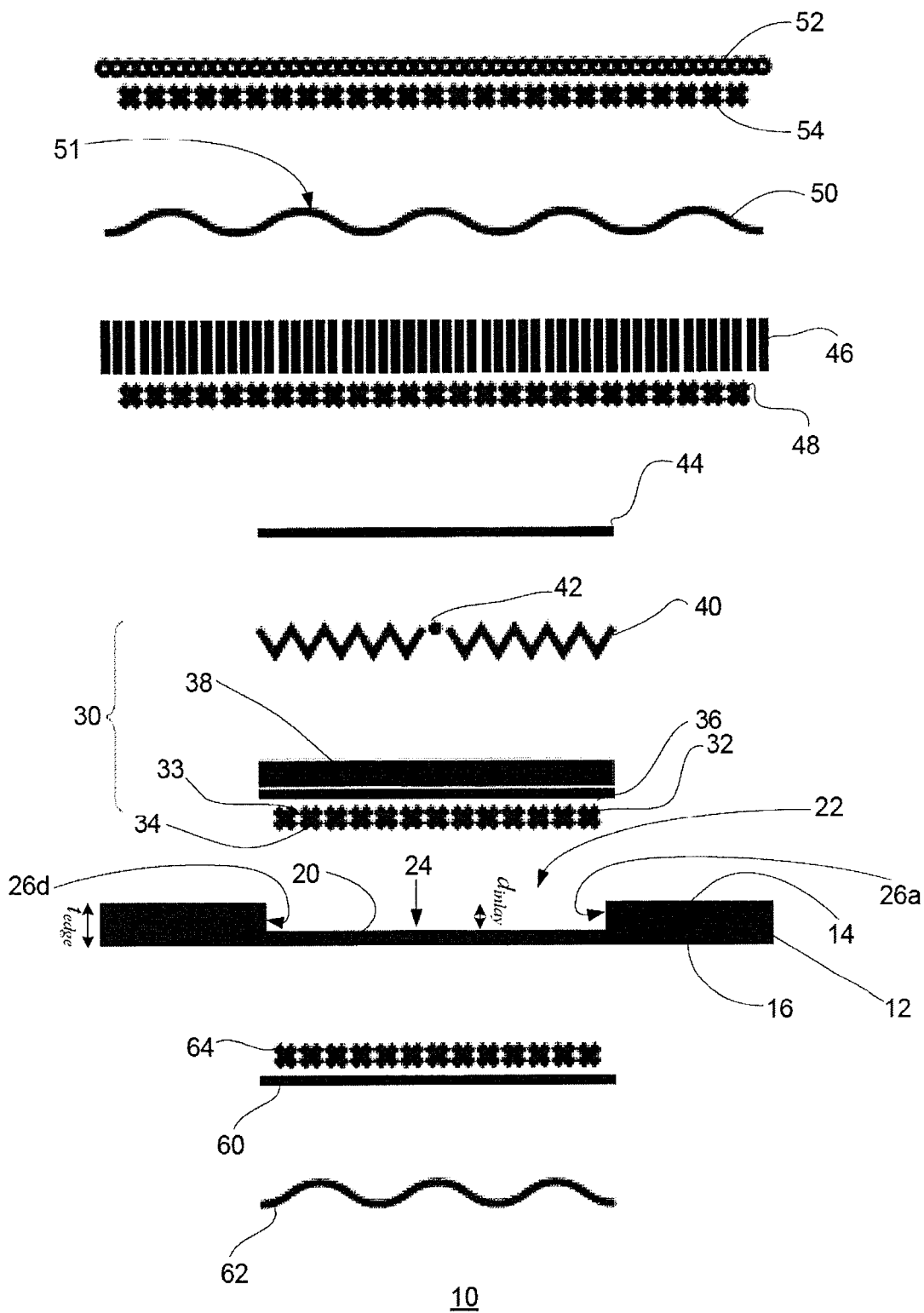
FIG. 2 shows a cross-section of the exemplary road sign of FIG. 1.

FIG. 1 shows an exploded view of an exemplary road sign, generally identified by reference numeral 10, in an exemplary embodiment. Sign 10 comprises a substrate 12 made from properly prepared metallic blanks for desired adhesion and sign durability, and for support of fastening means, such as screws, rivets, nuts and bolts for affixing sign 10 to a post or surface. Substrate 12 includes opposing planar faces, that is, sign face 14 and back face 16, having peripheral side edges 18a-d of a known thickness ($t_{edge}$). Sign face 14 of substrate 12 is chemically cleaned and etched or mechanically abraded in accordance with the American Society for Testing and Materials (ASTM) standards, or equivalent guidelines from other standards issuing bodies. The back face 16 is rendered dull and non-reflective either by mechanical or chemical means. Substrate 12 may comprise a plurality of shapes dependent of the message sign 10 is to impart, for example, a rectangular shaped substrate 12 is commonly employed for information signage, while an octagonal shaped substrate is associated with a primary traffic symbol. The metallic blanks may be made from aluminum or zinc/aluminium alloy coated structural steel, among others.

Substrate 12 comprises recessed portion 20 with an opening 22 on sign face 14, bottom 24, including side walls 26a-d with a depth ($d_{inlay}$) from opening 22 dimensioned to be less than the thickness ($t_{edge}$) of substrate 12.

Radio-frequency identification (RFID) tag assembly 30 is received by recessed portion 20, and RFID tag assembly 30 includes double-sided adhesive sheet 32 with one side 33 applied to bottom 24, and opposing side 34 adhered to metal shielding sheet 36 associated with RFID mounting substrate 38. RFID tag assembly 30 includes integrated circuit (IC) chip 40 and antenna 42 is mounted on RFID mounting substrate 38. IC chip 40 comprises memory for storing a unique identifier associated with RFID tag assembly 30, and may include attribute data, as well be described later. Paper label 44 may be applied over RFID tag assembly 30, and may include details pertaining to the characteristics of RFID tag assembly 30, such as manufacturer, operating frequency, and so forth. RFID tag assembly 30 is dimensioned to fit within recessed portion 20 such that the thickness of RFID tag assembly 30 is equal to or less than $d_{inlay}$, such that RFID tag assembly 30 does not protrude therefrom, and is protected from any pressure exerted during the manufacture of sign 10, or while in operation.

Retroreflective sheeting 46 is applied to sign face 14 via double-sided pressure-sensitive adhesive sheeting 48. Accordingly, retroreflective sheeting 46 and adhesive sheeting 48 hermetically seal RFID tag assembly 30 within recessed portion 20, such that RFID tag assembly 30 is protected from damage due to rain, dirt, sun, wind and snow, or vandalism. Translucent vinyl backed material 50 with primary indicia 51, such as screened ink, is applied to retroreflective sheeting 46, and an anti-graffiti sheet 52 may be applied over transparent vinyl backed material 50 via adhesive sheet 54. Indicia 51 comprises traffic symbols, images and alphanumeric characters.

Anti-graffiti sheet 52 is a clear film designed to be applied over the retroreflective sign face 14 during sign manufacture and act as a barrier layer between graffiti and the underlying sign face material. The use of such film over a screen printed face allows graffiti to be removed without removing indicia 51 as well, allowing reasonable sign reclamation without needing to replace it with a new sign. Label sticker 60 with secondary indicia 62, such as a barcode may be applied to back face 16 via label adhesive 64. Indicia 62 may also include municipal details and/or sign manufacturer details.

Figure 3:
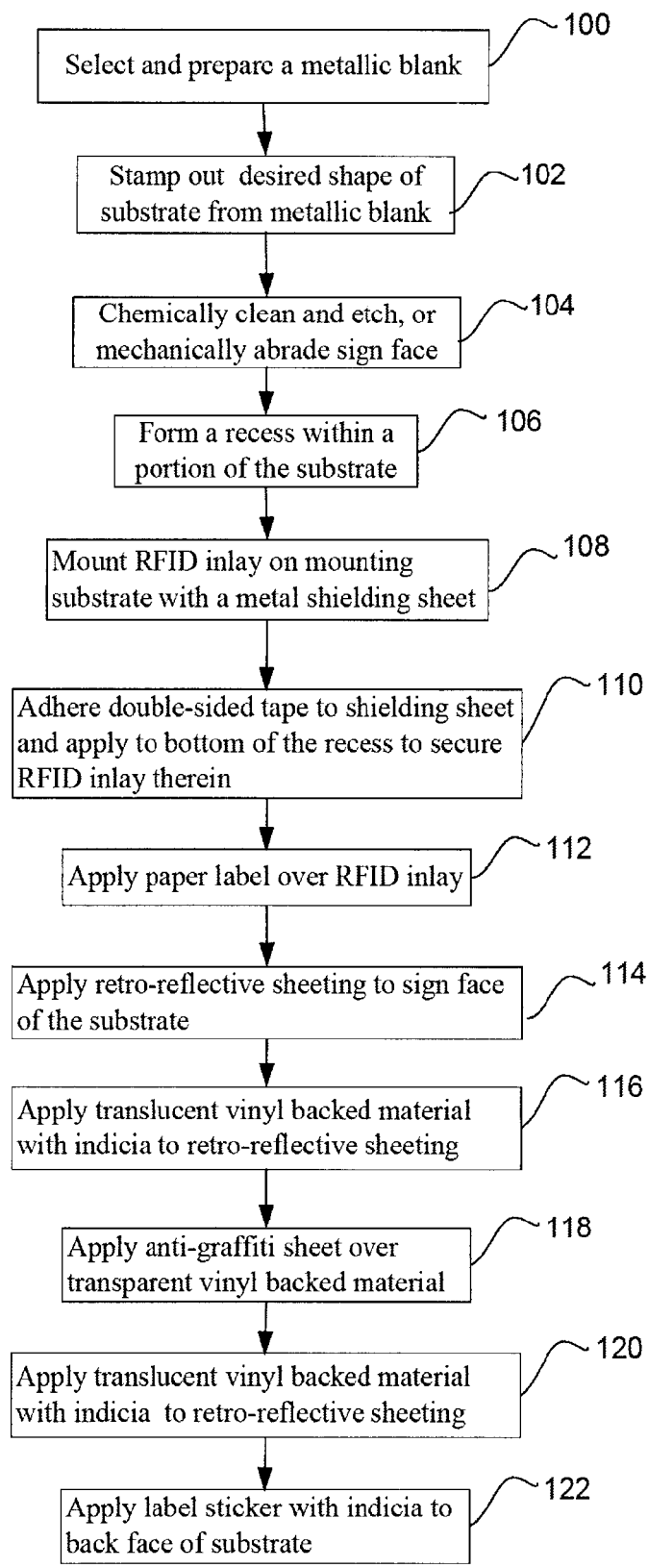
FIG. 3 shows a high level flow diagram illustrating an exemplary process steps for manufacturing the road sign.

Turning now to FIG. 3, there is shown a high level flow diagram illustrating exemplary process steps for manufacturing an exemplary sign 202a, 202b, or 202c. The process comprises the steps of: selecting and preparing a metallic blank for desired adhesion and sign durability and support for fastening means (step 100). The metal blank may be made from sheet metal material, such as aluminum, provided in the form of cut or blanked panel, and is generally a planar sheet metal component with an outer periphery having a pair of opposing edges. Next, a substrate 12 is stamped out or punched out from the metal blank in a shape corresponding to a desired sign (step 102); for example a rectangular shaped substrate is commonly employed for information signage, while an octagonal shaped substrate is associated with a primary traffic symbol. Other shapes include circles, triangles, diamonds, and hexagons, among others. Next, sign face 14 is chemically cleaned and etched or mechanically abraded in accordance with the American Society for Testing and Materials (ASTM) standards, or equivalent guidelines from other standards issuing bodies (step 104). Back face 16 is rendered dull and non-reflective either by mechanical or chemical means Next, recess 20 is formed within substrate 12, and includes opening 22 on sign face 14, bottom 24, and side walls 26a-d (step 106). Side walls 26a-d comprise a depth ($d_{inlay}$) from opening 22 dimensioned to be less than the thickness ($t_{edge}$) of the substrate 12. In step 108, integrated circuit (IC) chip 40 and antenna 42 are mounted on RFID mounting substrate 40 with metal shielding sheet 36, and double-sided adhesive sheet 32 to form RFID tag assembly 30. Next, RFID tag assembly 30 is placed in recess 20 and secured therein via double-sided adhesive sheet 32 with one side 33 adhered to metal shielding sheet 36 and opposing side 34 engaging bottom 24 of recess 20 (step 110). RFID tag assembly 30 is dimensioned to fit within recessed portion 20 such that the thickness of RFID tag assembly 30 is equal to or less than $d_{inlay}$, such that RFID tag assembly 30 is housed therein without protruding beyond sign face 14. Accordingly, RFID tag assembly 30 is protected from any pressure exerted during the manufacture of the article or during its use. Next, paper label 44 is applied over RFID tag assembly 30 (step 112), and paper label 44 may include details pertaining to characteristics of RFID tag assembly 30, such as manufacturer, operating frequency, and so forth.

In step 114, retroreflective sheeting 46 is applied to sign face 14 via double-sided pressure-sensitive adhesive sheeting 48. Accordingly, retroreflective sheeting 46 and adhesive sheeting 48 hermetically seal RFID tag assembly 30 within recessed portion 20, such that RFID tag assembly 30 is protected from the elements, such as rain, dirt, sun, wind and snow. Advantageously, damage of RFID tag assembly 30 is substantially diminished and the operating life is greatly enhanced. Next, translucent vinyl backed material 50 with indicia 51, corresponding to the message the sign is to convey, is applied to retroreflective sheeting 46 (step 116), and anti-graffiti sheet 52 may be applied over transparent vinyl backed material 50 via adhesive sheet 54 (step 118). In step 120, label sticker 60 with indicia, such as barcode 62, is applied to back face 16 via label adhesive 64. Indicia 62 may also include municipal details and/or sign manufacturer details.

Figure 4:
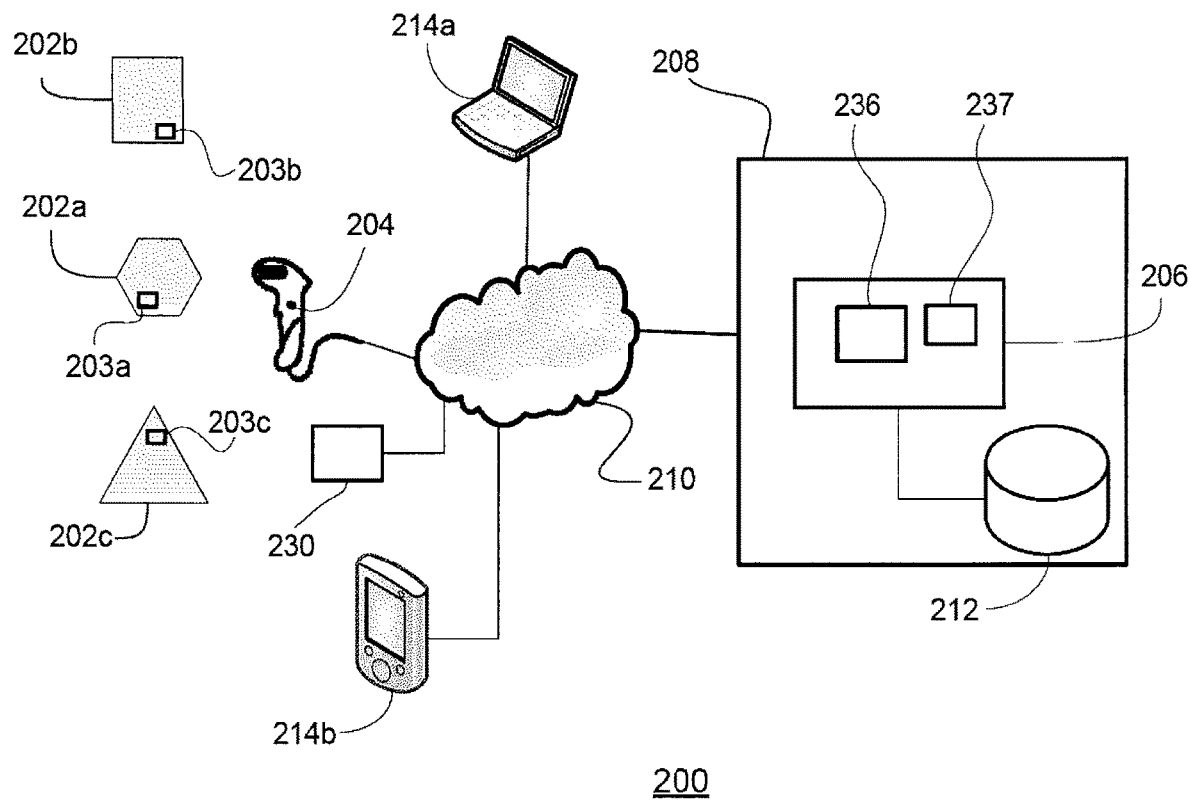
FIG. 4 shows a high level system diagram illustrating an exemplary sign compliance management system.

Turning now to FIG. 4, there is shown a high level system diagram illustrating an exemplary sign compliance management system, generally designated by numeral 200. A plurality of signs 202a, 202b, and 202c are located on road ways in a geographical area. As noted above, each sign 202a, 202b, 202c includes RFID tag assembly 302a, 302b, 302c, respectively, embedded at the point of manufacture. The IC chip 40 includes memory which stores the unique tag ID, unique sign ID data, and may include sign attribute data, such as, installation date, sign type, dimensions, substrate material, grade and manufacturer of reflective sheeting, manufacturer's name, batch number, manufacturer's certificate of conformity with government specifications, material grade, date of delivery, date of use and Material Data Sheet (MDS), location, jurisdiction (municipality, provincial, state, federal), Manual of Uniform Traffic Control Devices (MUTCD) Code, face direction, sign face condition assessment, inspection date, reason for critical rating, last inspection dates and results, recent maintenance events, next scheduled inspection/maintenance.

Reading and writing (data calling, registration, deletion, updating, and others) of RFID tag assembly 30 is executed by reader/writer 204 via antenna 42 which interrogates RFID tag assembly 30 to acquire data recorded in the memory associated with IC chip 40. Various frequency bands may be used with the RFID tag assembly 30, e.g., LF band (125 kHz), HF band (13.56 MHz), UHF band (960 MHz) and SHF band (2.45 GHz), among others. A communication distance enabling wireless communication differs depending on a frequency band to be used, and an optimum antenna length varies depending on a frequency band.

RFID reader 204 includes electronic circuitry comprising a transceiver associated with a suitable antenna, which interrogates RFID tag assemblies 302a, 302b, 302c, to acquire the stored sign data. The sign data is transmitted to a computing system 206 of a sign compliance management unit 208 via communications network 210, such as the Internet, and/or any other suitable network. Examples of computing system 206 may include, but are not limited to: a personal computer, a server computer, a series of server computers, a mini computer, and a mainframe computer. For example, server computer 206 comprises one or more databases 212, which may be any type of data repository or combination of data repositories, which store records or other representations of data. Accordingly, sign data is stored on databases 212 and is accessible to user devices 214a, 214b via server computer 206. Databases 212 may also include information pertaining to inspection programs (day and night), reflectivity tests, quality control, and warehouse and field inventories. Accordingly, RFID tag assembly 30 stores field data or a field report about each of sign 202a, 202b, or 202c, its operation and its maintenance/inspection history, such that each road sign 202a, 202b, 202c may be tracked throughout the whole duration of its useful life.

Alternatively, some or all of the foregoing sign attribute data, with the exception of the unique tag ID or unique sign ID, can be stored in a searchable database residing in the RFID reader 204, server computer 206 or user devices 214a, 214b. As an example, the RFID reader 204 receives the unique tag ID or unique sign ID from the RFID tag assembly 30 memory and then retrieves the data associated with that unique tag ID or unique sign ID from a database resident on RFID reader 204, or databases 212 associated with server computer 206 or user devices 214a, 214b.

Server computer 206 comprises sign compliance management module 236 having a sign compliance management process executable by a processor of server computer 206, in conjunction with the system database 212, to manage signs 202a, 202b, 202c of system 200. User devices 214a, 214b allow a user to view information, or administer information on system 200. User devices 214a, 214b may be in the form of any kind of general processing structure, and may for example include any device, such as, a personal computer, laptop, computer server, handheld user device (e.g. personal digital assistant (PDA), mobile phone, tablet, smartphone).

Figure 5:
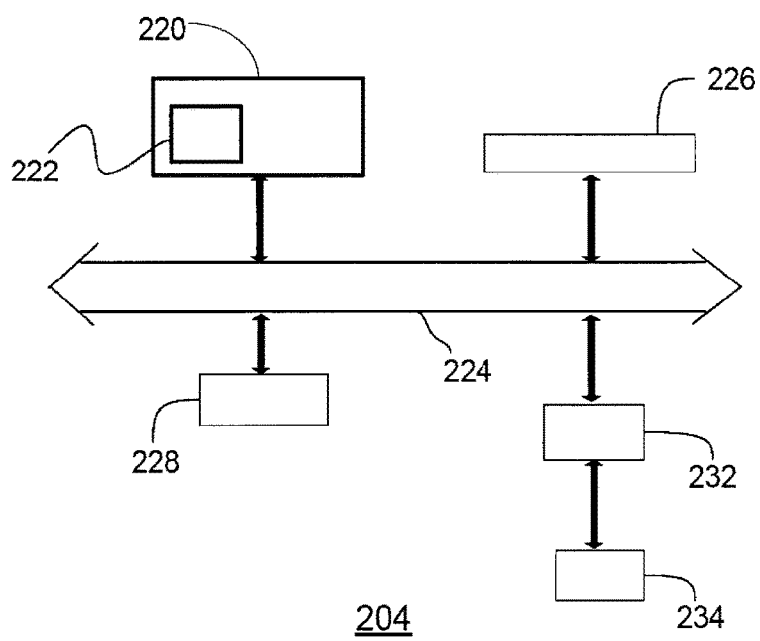
FIG. 5 shows a schematic diagram of an exemplary RFID reader.

Now turning to FIG. 5, there is shown a schematic diagram of an RFID reader 204, comprising processing and control module 220 having processing circuitry, such as, microprocessor 222, which is arranged to communicate, via system bus 224, with memory 226. The skilled person will appreciate that memory 226 may be provided by a variety of components including a volatile memory, a hard drive, a non-volatile memory, etc. Indeed, memory 226 comprises a plurality of components under the control of, or otherwise connected to, processor 222. However, typically memory 226 provides a program storage portion arranged to store program code which when executed performs an action, and a data storage portion which can be used to store data either temporarily and/or permanently.

RFID reader 204 also includes communications interface module 228 with a transceiver for transmitting signals, and for receiving signals from other road signs 202a, 202b, and 202c 10, as will be described in more detail below. Communications interface module 228 may include a wired interface, wireless interface, optical, IR interface or RF interface, and may use standard protocols such as SONET, SDH, Zigbee, Ethernet, Wi-Fi (e.g. IEEE 802.11a/b/g/n, WiMax), Bluetooth, powerline communication (e.g. IEEE 1901), GSM/GPRS, IS-41 (CDMA, TDMA, AMPS), or other standard and non-standard physical layers well known to those skilled in the art. In addition, communications interface module 228 enables connection to shared or remote drives, one or more networked computers 206, or other networked devices 214a, 214b, via communications network 210. Each RFID reader 204 includes a unique identifier, such as a media access control (MAC) address, which is registered with server computer 206. Alternatively, RFID reader 204 communicates with network-enabled wireless devices, such as Wi-Fi access point 230, and access point 230 transmits information obtained from the RFID reader 204 to server computer 206. Alternatively, RFID reader 204 is communicatively coupled to user device 214a or 214b, and user device 214a or 214b is communicatively coupled to server computer 206 via a communications interface module similar to communications interface module 228. RFID reader 204 may also include input/output controller 232 to which input/output devices 234, such as a keypad, keyboard or display unit, are coupled to.

A user can dynamically set a read/write range of RFID reader/writer 204, for example, RFID reader 204 can be set to read tags 203a, 203b, and 203c from a 12 inch range to a 30 foot range. The user can take an inventory of tags 203a, 203b, 203c in a selected range and upload the data to compliance management unit 208 in real-time, when RFID reader 204 is communicatively coupled to communication network 210. Alternatively, the inventory could be captured and uploaded to server computer 206 via a synchronizing process at user device 214a or 214b. Additionally, the users can enter a specific sign identifier or asset number on RFID reader 204, and RFID reader 204 will only locate the corresponding tag 203a, 203b, or 203c associated with the sign identifier within the range of RFID reader 204. Such RFID reader 204 may also be used to dynamically upload data to compliance management unit 208.

Each RFID reader 204 includes a unique identifier, such as a media access control (MAC) address, which is registered with server computer 206. Alternatively, RFID reader 204 communicates with network-enabled wireless devices, such as a Wi-Fi access point 230 which transmits information obtained from the RFID reader 204 to server computer 206. Alternatively, RFID reader 204 is communicatively coupled to user device 214a or 214b, and user device 214a or 214b is communicatively coupled to server computer 206 via a communications interface module similar to communications interface module 228. RFID reader 204 may also include an input/output controller 232 to which input/output devices 234, such as a keypad, keyboard or display unit, are coupled to.

Figure 6:
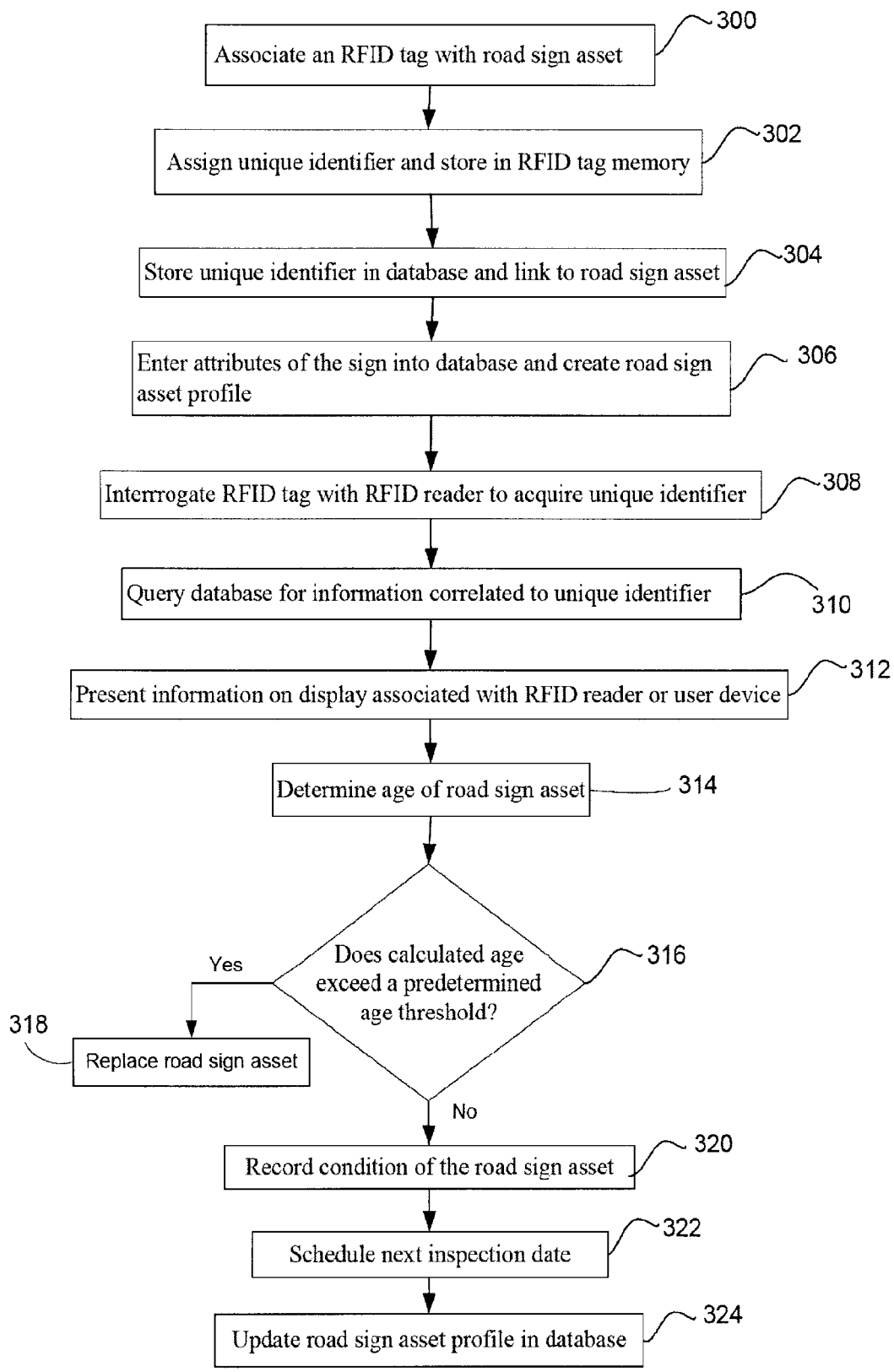
FIG. 6 shows a high level flow diagram illustrating an exemplary process steps for tracking a road sign.

FIG. 6 illustrates an exemplary process for tracking sign 202a, 202b, or 202c in system 200. In step 300, each road sign 202a, 202b, or 202c to be tracked is tagged with RFID tag 203a, 203b, or 203c. While each tag 203a, 203b, or 203c comprises a unique tag identifier (tag ID), a unique sign identifier (sign ID), such as a code pertaining to a particular jurisdiction e.g. municipality, province or state, may be assigned and stored within the memory of RFID tag 203a, 203b, or 203c (step 302). Accordingly, RFID reader/writer 204 transmits the unique sign identifier for storage in memory of RFID tag 203a, 203b, or 203c. In step 304, the unique tag identifier or a unique sign identifier is entered into database 212 and is relationally linked with sign 202a, 202b or 202c to which it is attached. Next, the attributes of sign 202a, 202b or 202c are entered into the database (step 306), and may include any of, sign type, dimensions, substrate material, grade and manufacturer of reflective sheeting, location, jurisdiction (municipality, provincial, state, federal), Manual of Uniform Traffic Control Devices (MUTCD) Code, face direction (e.g. E, N, NE, NW, S, SE, SW, W), sign face condition assessment, inspection date, reason for critical rating, last inspection dates and results, recent maintenance events, next scheduled inspection/maintenance, among others. For example, the assessment results in a rating of each sign in one of four categories, such as: "Critical" indicating immediate replacement is required; "Poor" indicating replacement is required within 12 months; "Fair" indicating that the sign is functional but has evidence of deterioration, and replacement is anticipated between 2 and 5 years; and "Good" indicating that there is no evidence of reduced performance and remaining service life is 5 years.

The attribute data also includes details of the sign type, such as regulatory, guide, warning, school, object/other. In addition, other attributes such as post type (e.g. building, fence, gate, I-beam, light pole, overpass, round, signal mast, signal pole, square, u-channel, utility pole), including the condition of the sign (e.g. critical, poor, fair, good). With respect to the "Fair" categorization, further attributes may include discolored, reflectivity, faded, graffiti, sticker, playbill, among others; while for "Critical" categorization, further attributes may include reflectivity, discolored, faded, obstructed, graffiti, among others.

Also, the post material (e.g. concrete, steel, wood, other) may be specified, including the condition of the post (e.g. critical, poor, fair, good). With respect to the "fair" categorization, further attributes may include damage, graffiti, leaning, rusted, and twisted, among others.

Once the unique tag identifier or a unique sign identifier and attributes of each road sign 202a, 202b, or 202c are entered in database 212, road sign 202a, 202b, 202c may be tracked and managed. For example, a user selects a particular geographical area to inspect road sign 202a, 202b, 202c on a geographical information system (GIS) map, and with RFID reader 204 interrogates an RFID tag 203a on road sign 202a, such as a "STOP" sign (step 308) to read the data in the RFID tag memory. For example, RFID reader 204 receives the unique tag ID or the unique sign ID and issues a query to database 212 (step 310) for information correlated to unique tag ID or the unique sign ID, such as sign attribute data. In step 312, the attributes of the sign 202a, as described previously, are presented to user device 214a or 214b, which may include the last inspection dates and results, or historical maintenance events, among others. Next, a comparison between the installation date and current date of inspection is performed to determine the age of sign 202 (step 314), and a determination whether the calculated age exceeds a predetermined age threshold for replacement is made (step 316). When the age threshold is exceeded, then sign 202a is scheduled for immediate replacement, or is replaced contemporaneously (step 318), otherwise other attributes visible to the user are noted, such as present condition of sign 202a is noted (e.g. "Fair", or "Good"), including the condition of the post type (step 320). Signs 202a, 202b, and 202c that are visually identified by the user and have retro-reflectivity below the minimum levels are also scheduled for replacement, or replaced contemporaneously. Once a sign 202a is replaced attributes such as the sheeting type and installation date are recorded in database 212 and a date for expected replacement of road sign 202a, 202b or 202c is determined based on its installation date, condition and other attributes.

Next, the next scheduled inspection or maintenance date is entered, or automatically calculated based on user-defined default inspection time frames or standards mandated inspection time frames (step 322). In the next step, details of the inspection or maintenance event pertaining to sign 202a, including the date/time of inspection, user identifier of the inspector, are recorded and database 212 is updated (step 324).

Figure 7:
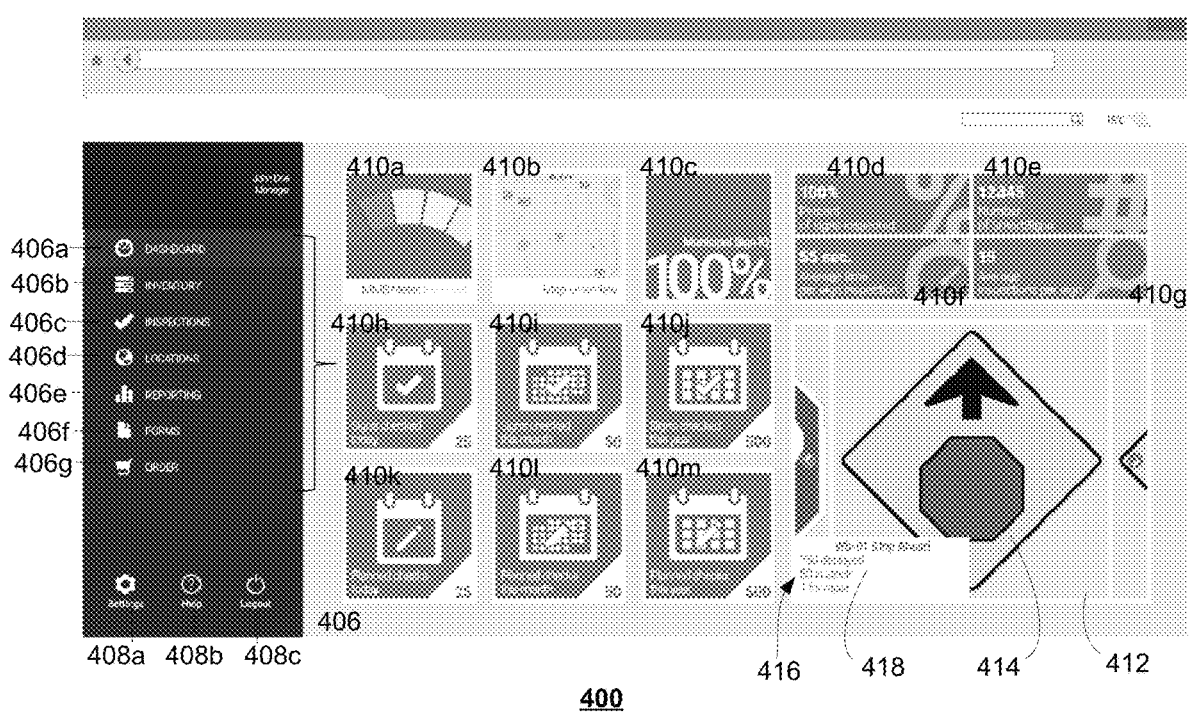
FIG. 7 shows an exemplary user interface.

FIG. 7 shows exemplary user interface 400 on user device 214a or 214b, such as a web-based interface which allows inputting, editing, outputting of the sign information, and administration of the compliance system. For example, user interface 400 is accessible to authorized users, and the authorized users may have different user-access privileges and associated actions that they may perform on the system. User interface 400 may presented via a web browser client, such as Microsoft Internet Explorer or Firefox, or client software other than a web browser. Web browser client may include functional control module, which controls user interface 400. An example of a functional control module is a Java applet, which is downloaded when the user accesses the web page for the host application having user interface 400.

Exemplary user interface 400 comprises two frame portions 402, 404. Frame 402 is configured to include a plurality of tabs 406, each of which, when selected invokes a display of icons associated with tabs 406 in portion 404. There may be some redundancy of information or functionality between screens corresponding to the different tabs 406, but each tab 406 is associated with a particular application module 237 and to display at least some information or functionality that is not found in any other single tab 406. Exemplary modules include dashboard module 237a, inventory module 237b, inspection module 237c, location module 237d, compliance reporting module 237e, forms module 237f, and order module 237g. Any of tabs 406 may be selected and include "Dashboard" tab 406a, "Inventory" tab 406b, "Inspections" tab 406c, "Locations" tab 406d, "Reporting" tab 406e, "Forms" tab 406f and "Order" tab 406g. As an example, actuating "Dashboard" tab 406a displays a menu or collection of icons 410 in portion 404. A compliance reporting module 237a compiles a field report including the contemporaneous condition of signs 10, following actuation of "Reporting" tab 406e.

Menu 410 therefore includes icons representing associated applications, services, or widgets available to the user. By way of example, upon touching an icon, a new interface is presented in portion 404 to provide access to the corresponding application. A user may then close the subsequent interface via, by way of example and not by way of limitation, a subsequent touch to a specified "close" button thereby returning to the previous menu 410. Frame portion 402 also includes "Settings" icon 408a for user configuration, "Help" icon 408b and "Logout" icon 408c.

Exemplary applications or services available upon actuating "Dashboard" tab 406a may include metering and statistical applications or services related to compliance rates accessible by selecting MMS meter icon 410a. As another example, mapping and location applications or services for display of signs within a chosen geographical area may be accessible by selecting "Map" icon 410b. The overall knowledge of the signs within a chosen municipality or geographical region is displayed by "Municipal Sign IQ" icon 410c, and selection displays the underlying data. Selecting any of the "Summary" icons 410d, 410e, 410f, and 410g displays summaries related to sign inspections, number of managed signs, sign inspection duration, and sign inspection rates. Immediate statistics related to sign maintenance are available via scheduling and maintenance icons 410h, 410i, 410j, 410k, 410l, and 410m. For example, icon 410h shows the number of signs inspected on a particular day, while icon 410i displays the number of signs inspected or checked within a particular time period, such as a month, and icon 410j displays the number of signs inspected within a particular year. Other icons 410k, 410l, and 410m display the number of scheduled inspections for a particular day, month and year, respectively. Selecting any of icons 410h, 410i, 410j, 410k, 410l, and 410m displays the underlying data, such as details of the actual signs that were inspected or scheduled to be checked. Portion 406 also includes a persistent window 412 displaying a plurality of scrollable images 414 of signs. For each displayed sign, details 416 such as the description of the sign, the deployed quantity of that sign, inventory levels of that sign and quantity of that sign scheduled for repair, are also displayed in an overlay window 418.

Figure 8:
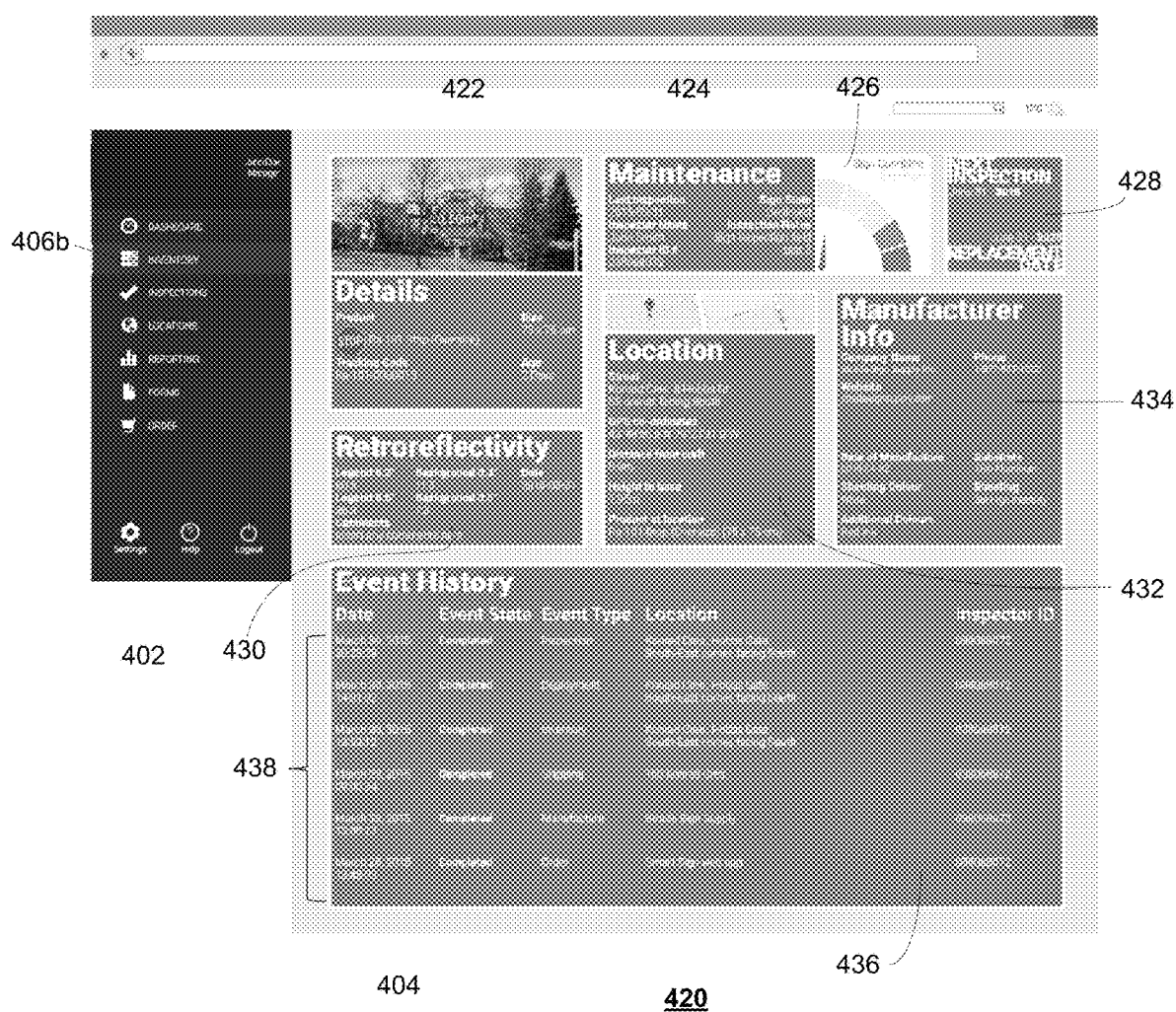
FIG. 8 shows another exemplary user interface.

Now turning to FIG. 8, there is shown in portion 404 a display 420 with a plurality of content items related to a particular selected sign, following selection of "Inventory" tab 406b. For example, selection of a stop sign results in a "Details" content window 422, which includes an actual image of the installed sign in situ, dimensions of the sign, product details and the sign ID associated with the tag ID. Another content window 424 displays the maintenance data related to the selected sign, such as date of last maintenance or inspection, inspection personnel details, inspection identifier (ID), sign state and inspection notes. The condition of the selected sign is displayed in content window 426, and may include a colour-coded scale ranging from "poor" to "good". Content window 428 shows details related to the next scheduled inspection and a replacement date for the selected sign. Details pertaining to the retroreflectivity of the selected sign are displayed in content window 430. The geographical location of the selected sign is displayed in content window 432, and may include the street on which the selected sign is installed, GPS coordinates, distance from the curb, and so forth. Content window 434 shows manufacturer information, such as contact details, date of manufacture, sheeting characteristics, sheeting colour, substrate, and so forth. Event history content window 436 displays event details 438 pertaining to manufacturing, ordering, shipping, inventory, deployment and inspection. Each event is associated with a status designation (e.g., scheduled, in-progress, on-hold, and completed), location and a personnel identifier.

Figure 9:
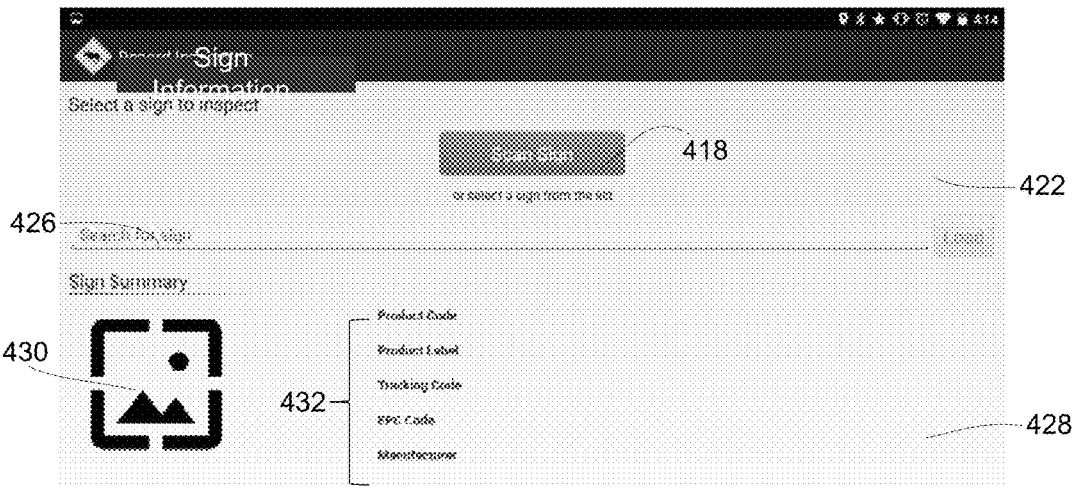
FIG. 9 shows another exemplary user interface.

FIG. 9 shows exemplary screen 440 with one portion 442 of screen 440 having "Scan Sign" button 444 which allows a user to scan a sign during an inspection, following selection of "Inspections" tab 406c in FIG. 7. Alternatively, a particular sign may be selected from a list of signs via a drop-down menu, or a search for a particular sign may be performed via query field 446. Once the sign is scanned or selected, a summary 448 of the sign is displayed in another portion 450 of screen 420. For example, the summary 448 may include image 452 corresponding to selected or scanned sign, and also includes sign information 454 related to the product code, product label, tracking code, EPC Code and manufacturer of the sign.

Figure 10:
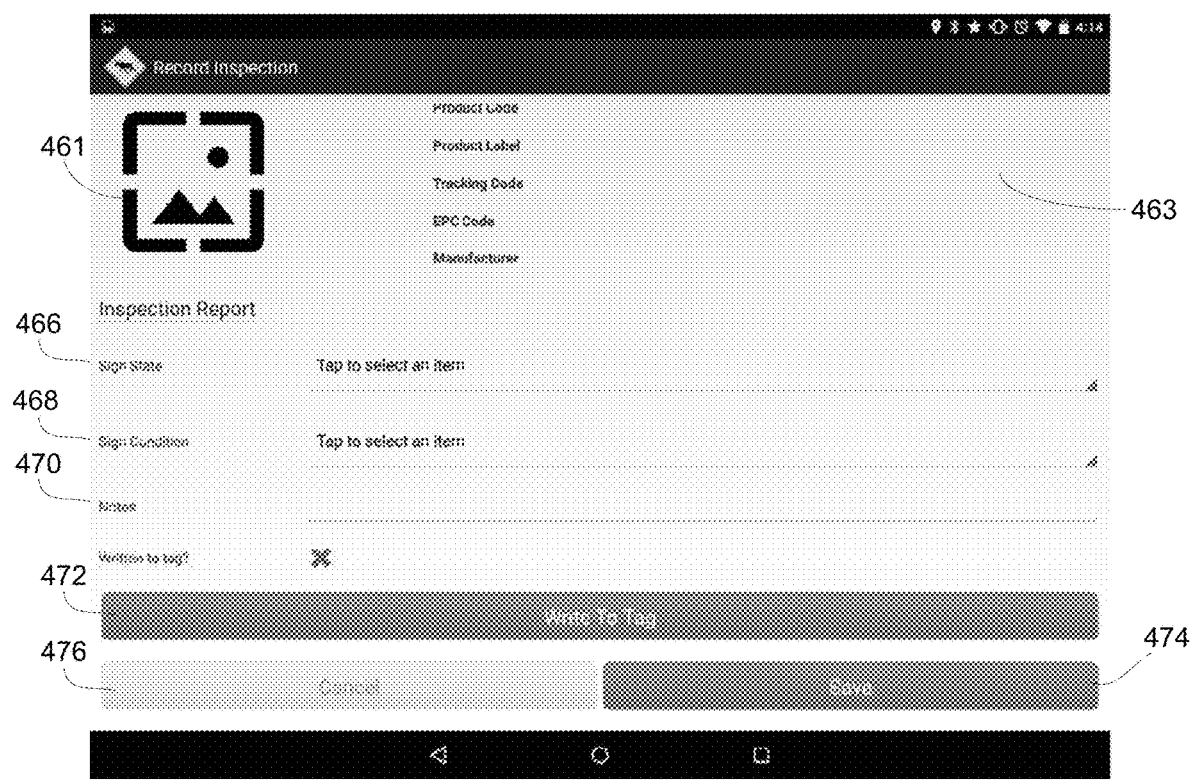
FIG. 10 shows another exemplary user interface.

Following an inspection, details of the inspection may be recorded via an exemplary screen 460, as shown in FIG. 10. An image 461 of the sign and summary 462 of the sign is displayed in portion 463 of screen 460. Portion 464 of screen 460 includes various data fields such as sign state 466, sign condition 468, and notes 470. Accordingly, a user may input or input data related to the state of the sign, its condition and any notes or observations related to the sign. Once data fields 466, 468 and 470 have been populated, a user may write the inputted data to the RFID tag associated with the sign by actuating "Write to Tag" button 472, and "Save" button 474 or forego recordal of the inspection by actuating "Cancel" button 476.

Figure 11:
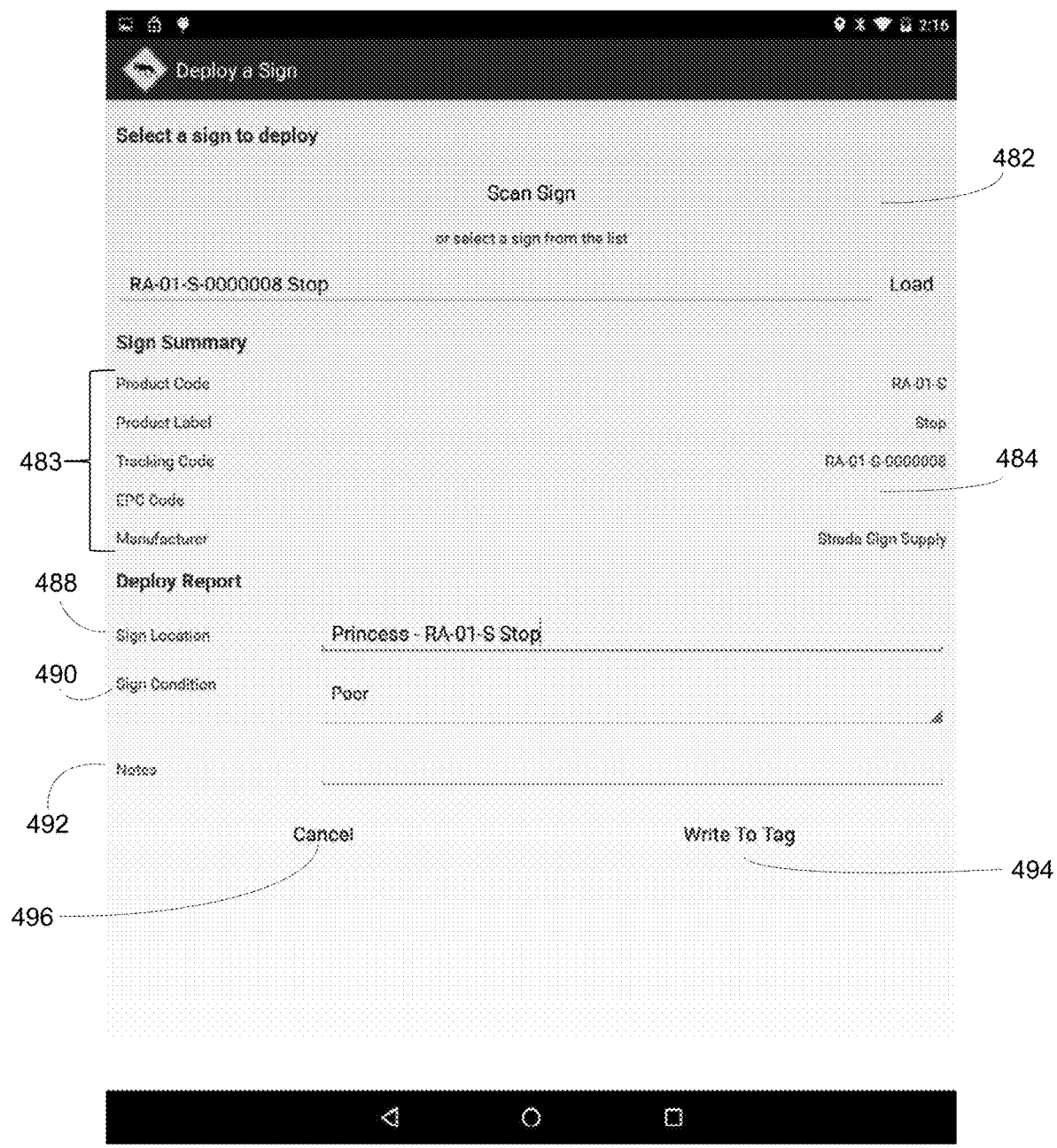
FIG. 11 shows yet another exemplary user interface.

In another embodiment, frame portion 402 includes a "Deploy Sign" tab which advances a user to an exemplary screen 480, as shown in FIG. 11, which allows a user to perform a general scan, or read, of a sign to be deployed in the field, in portion 482 of screen 480. A summary 483 of the sign is displayed in another portion 484 of screen 480. Portion 486 of screen 480 includes various data fields such as sign location 488, sign condition 490, and notes 492. Accordingly, a user may input data related to the geographical location of the sign, its condition and any notes or observations related to the sign. Once data fields 488, 490 and 492 has been populated, a user may write the inputted data to tag 203a associated with the sign by actuating "Write to Tag" button 494, and "Save" button (not shown) or forego deployment by actuating "Cancel" button 496.

User interface 400 may include a communication toolbar that enables a user to communicate via multiple types of communication channels, such as e-mail, telephone, facsimile, and wireless messaging. Furthermore, user interface 400 may be configured to include, for example, "Previous" and "Next" buttons (not shown) to enable navigation, or view records related to the signs, users, and so forth. In addition, using web interface 400, user can define a plurality of queries based on specific attribute criteria. Commonly executed queries can be saved and loaded to a user's profile. For example, users can query the inventory to identify signs that are nearing expiration and should be replaced. A missing asset report may also be generated, which shows all signs that system 200 has not received tag reads for, for a specified period of time.

In addition, alerts may be automatically outputted based on user-defined criteria.

In yet another exemplary embodiment, sign 202a, 202b, or 202c includes a printed circuit board (PCB) comprising processing and control module having processing circuitry, such as, microprocessor, which is arranged to communicate, via system bus, with memory. The skilled person will appreciate that memory may be provided by a variety of components including a volatile memory, a hard drive, a non-volatile memory, etc. Indeed, memory comprise a plurality of components under the control of the, or otherwise connected to, the processor. However, typically memory provides a program storage portion arranged to store program code which when executed performs an action, and a data storage portion which can be used to store data either temporarily and/or permanently. The PCB also includes a communications interface module with a transceiver for emitting radio signals, and for receiving radio signals from other signs sign 202a, 202b, and 202c, as will be described in more detail below. Communications interface module may include a wired interface, wireless interface, optical, IR interface or RF interface, and may use standard protocols such as SONET, SDH, Zigbee, Ethernet, Wi-Fi (e.g. IEEE 802.11a/b/g/n, WiMax), Bluetooth, powerline communication (e.g. IEEE 1901), GSM/GPRS, IS-41 (CDMA, TDMA, AMPS) or other standard and non-standard physical layers well known to those skilled in the art. In addition, communications interface module enables connection to shared or remote drives, one or more networked computers 206, or other networked devices 214a, 214b, via communications network 210. PCB also includes a power unit which receives direct current (DC) electrical power e.g. batteries, and/or alternating current (AC) electrical power.

In one embodiment, sign 202a, 202b, or 202c is associated with photovoltaic (PV) system coupled to the power unit. PV cells may be incorporated with the sign, such as on the face of the sign 202a, 202b, or 202c, or the rear of the sign 202a, 202b, or 202c. Alternatively, the PV cells are positioned such that the signage is not blocked, such as above sign 202a, 202b, or 202c, or besides the sign 202a, 202b, or 202c, or on the post type (e.g. building, fence, gate, I-beam, light pole, overpass, round, signal mast, signal pole, square, u-channel, utility pole). Power unit may receive and manage power from a plurality of disparate systems, such as PV system, DC power and AC power.

In yet another embodiment, signs 202a, 202b, and 202c are network-enabled and are capable of transmitting data pertaining to the sign 202a, 202b, or 202c automatically, or at predetermined time periods to server computer 206. Alternatively, signs 202a, 202b, and 202c within a particular geographic area that are relatively proximate to each other, such as an intersection, can communicate with each other i.e. motes within a mesh network, and at least one of these signs 202a, 202b, and 202c includes a communications interface coupled to communications network 210, and acts as an access point. Accordingly, signs 202a, 202b, and 202c are able to communicate with each other to relay messages to each other and provide status of each mote, and the recorded data is transmitted to server computer 206 of compliance management unit 208.

In yet another embodiment, sign 202a, 202b, or 202c includes a GPS circuit having at least one GPS sensor for determining location of sign 202a, 202b, or 202c, and the GPS data is transmitted to server computer 206 via communication network 210 for use in mapping, planning, maintenance and monitoring applications, as well as asset recovery.

In yet another embodiment, sign 202a, 202b, or 202c includes an acceleration sensor circuit having at least one acceleration sensor or accelerometer for detecting the acceleration of sign 202a, 202b, or 202c in the event of an accident, severe weather e.g. hurricanes, or tornadoes, theft or vandalism. The sensed data is transmitted to server computer 206 via communication network 210.

In yet another embodiment, sign 202a, 202b, or 202c includes a gyroscopic sensor circuit having at least one sensor to provide real time updates of the orientation of sign 202a, 202b, or 202c based on a plurality of axes. For example, the memory on the PCB comprises threshold values (e.g. high and/or low) for a plurality of orientation angles, and the processor executes instructions to compare the sensed values to the stored threshold values, and when the sensed values exceed the stored values (or outside a prescribed range), then an action is taken, such as an alert or notification to the server computer 206. As an example, the alert or notification may include details of sign 202a, 202b, or 202c, such as identity, location, sensed values, and threshold values, among others, to trigger an appropriate action by a user. For example, if one sign 202a, 202b, or 202c experiences a force that causes it to tilt or fall down e.g. in the event of a vehicular accident or severe weather, then the sensed gyroscopic data is transmitted to server computer 206. Alternatively, when sign 202a, 202b, or 202c is configured to report its gyroscopic status, among others, and the sign 202a, 202b, or 202c fails to report in to the network, and/or report the desired gyroscopic status, then an alert or notification is generated and sent to the responsible personnel.

In yet another embodiment, sign 202a, 202b, or 202c includes a speaker. For example, speaker is able to output commands, alerts, or confirmation during or following an inspection.

In another example, sign 202a, 202b, or 202c, such as a stop sign, may detect pedestrians approaching by interacting with their mobile devices, and issue a command to the traffic lights to stop traffic based on Bluetooth iBeacon™ technology, and also provide instructions for safe crossing in a default language set on their mobile devices. For example, if Person A's mobile device is set to "Hindi" language setting, and Person B's mobile device is set to "English" language setting, and Person C's mobile device is set to "French" language setting, the sign 202a will recognize that Person A, Person B, and Person C are all approaching and provide instructions in the respective languages either from an onboard speaker on sign 202a, or via the mobile device's speaker or headphones.

In yet another embodiment, sign 202a, 202b, or 202c includes a NFC tag for near-field communications with NFC-enabled devices to allow user interaction with the sign 202a, 202b, or 202c.

In yet another embodiment, sign 202a, 202b, or 202c comprises an integrated circuit (IC) chip comprises processing circuitry, memory for storing a unique identifier and/or unique sign identifier, and attribute data, and a communication interface similar to communication interface 228, such as a wireless communication interface with an associated antenna.

In yet another embodiment, sign 202a, 202b, or 202c includes an LCD/OLED/LED screen to display municipal maintenance data, the screen being positioned on the back face 16 of sign 202a, 202b, or 202c.

In yet another embodiment, the location data of signs 202a, 202b, and 202c or the Bluetooth iBeacon™ type technology can be used with software application addition for user device tracking. Currently, devices are tracked on three levels, onboard GPS, Wi-Fi maps, and cell tower triangulation. The use of signs 202a, 202b, and 202c presents yet another lower level form that would establish the mesh network infrastructure necessary to provide constant connectivity in environments that poorly account for the previously mentioned locating methods. (i.e., underground tunnels, subways, bridges, channels, indoors. Accordingly, any user device proximate to network-enabled sign 202a, 202b, or 202c in a mesh network can interface with sign 202a, 202b, or 202c via Bluetooth™, and the user device can therefore be located based on the positional data of sign 202a, 202b, or 202c. For example, traffic signs, way finding signs, informational signs, advertising signs, and other signs are typically deployed at a static location, and are therefore suitable for such an application.

In yet another exemplary embodiment, RFID tag 30 may be semi-active or active.

In yet another exemplary embodiment, substrate 12 may be non-metallic.

In yet another exemplary embodiment, recessed portion 20 with an opening 22 is formed on back face 16.

In yet another exemplary embodiment, recessed portion 20 with an opening 22 is formed in any of side edges 18a-d.

In yet another exemplary embodiment, in addition to traffic signs, and street lights and traffic signals may also be managed.

In yet another embodiment, an unmanned aerial vehicle (UAV) having an image acquisition device is employed for inspecting signs 202a, 202b, and 202c, and includes a RFID/reader writer 204 having features and functionalities, as described above. Accordingly, the UAV may be programmed to autonomously perform maintenance procedures, for example, the UAV may be provided with a list of GPS coordinates of signs 202a, 202b, and 202c for inspection and/or other actions to perform. Alternatively, the UAV is remotely controlled by personnel at a central command center.

In yet another embodiment, for existing or legacy traffic signs 10, RFID assembly 30 is encapsulated within a case and secured to the legacy traffic signs to enable compliance tracking by system 200. Accordingly, the case protects RFID assembly from the environmental elements.

User device 214a or 214b may be a general-purpose computer system comprising, for example, a processing unit, such as processor, system memory, and may for example include any device, such as, a personal computer, laptop, tablet, computer server, personal digital assistant (PDA), cellular phone, smartphone. One or more portions of the computer system may be distributed across one or more computer systems coupled to communications network 210. For example, various aspects of the invention may be distributed among one or more computer systems (e.g., servers) configured to provide a service to one or more client computers, or to perform an overall task as part of a distributed system. For example, various aspects of the invention may be performed on a client-server, hybrid client-server, or multi-tier system that includes components distributed among one or more server systems that perform various functions according to various embodiments of the invention. The system also includes as input/output (I/O) devices coupled to the processor via an I/O controller. The input/output (I/O) devices include, for example, a keyboard, mouse, trackball, microphone, touch screen, a printing device, display screen, speaker, etc. A communications interface device provides networking capabilities using Wi-Fi, and/or other suitable network format, to enable connection to shared or remote drives, one or more networked computers, or other networked devices, via the communications network 210. The components of computer system may be coupled by an interconnection mechanism, which may include one or more buses (e.g., between components that are integrated within a same machine) and/or a network (e.g., between components that reside on separate discrete machines). The interconnection mechanism enables communications (e.g., data, instructions) to be exchanged between system components.

The processor executes sequences of instructions contained in memory, such as a machine readable medium. The machine readable medium includes any mechanism that provides (i.e., stores and/or transmits) information in a form accessible by a machine (e.g., a computer, network device, personal digital assistant, a smartphone, any device with a set of one or more processors, etc.). For example, machine readable media includes recordable/non-recordable media (e.g., read only memory (ROM); random access memory (RAM); magnetic disk storage media; optical storage media; flash memory devices; a hard disk drive, etc.), as well as electrical, optical, acoustical or other forms of propagated signals (e.g., carrier waves, infrared signals, digital signals, etc.). The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used. The operating system may be, for example, iPhone OS (e.g. iOS), Windows Mobile, Google Android, Symbian, or the like.

Server computer 206 includes a computer system with elements similar to those described above with reference to user device 214a or 214b. Server computer 206 may be a web server (or a series of servers) running a network operating system, examples of which may include but are not limited to: Microsoft® Windows® XP Server; Novell® Netware®; or Red Hat® Linux®, for example (Microsoft and Windows are registered trademarks of Microsoft Corporation in the United States, other countries, or both; Novell and NetWare are registered trademarks of Novell Corporation in the United States, other countries, or both; Red Hat is a registered trademark of Red Hat Corporation in the United States, other countries, or both; and Linux is a registered trademark of Linus Torvalds in the United States, other countries, or both).

Server computer 206 may execute a web server application, examples of which may include but are not limited to: Microsoft IIS, Novell Webserver™, or Apache® Webserver, that allows for HTTP (i.e., HyperText Transfer Protocol) access to server computer 206 via network 210 (Webserver is a trademark of Novell Corporation in the United States, other countries, or both; and Apache is a registered trademark of Apache Software Foundation in the United States, other countries, or both). Network 210 may be connected to one or more secondary networks (e.g., network 210), examples of which may include but are not limited to: a local area network; a wide area network; or an intranet, for example.

Database 212 may be, include or interface to, for example, the Oracle™ relational database sold commercially by Oracle Corp. Other databases, such as Informix™, DB2 (Database 2), Sybase or other data storage or query formats, platforms or resources such as OLAP (On Line Analytical Processing), SQL (Standard Query Language), a storage area network (SAN), Microsoft Access™ or others may also be used, incorporated or accessed in the invention. Alternatively, database 212 is communicatively coupled to server computer 206.

The user devices 214a, 214b and server computer 206 may communicate with each other using network-enabled code. Network enabled code may be, include or interface to, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMWL), Wireless Markup Language (WML), Java™, Java™ Beans, Enterprise Java™ Beans, Jini™, C, C++, Perl, UNIX Shell, Visual Basic or Visual Basic Script, Virtual Reality Markup Language (VRML), ColdFusion™ or other compilers, assemblers, interpreters or other computer languages or platforms.

The communications network 210 can include a series of network nodes (e.g., the clients and servers) that can be interconnected by network devices and wired and/or wireless communication lines (such as, public carrier lines, private lines, satellite lines, etc.) that enable the network nodes to communicate. The transfer of data between network nodes can be facilitated by network devices, such as routers, switches, multiplexers, bridges, gateways, etc., that can manipulate and/or route data from an originating node to a server node regardless of dissimilarities in the network topology (such as, bus, star, token ring, mesh, or hybrids thereof), spatial distance (such as, LAN, MAN, WAN, Internet), transmission technology (such as, TCP/IP, Systems Network Architecture), data type (such as, data, voice, video, multimedia), nature of connection (such as, switched, non-switched, dial-up, dedicated, or virtual), and/or physical link (such as, optical fiber, coaxial cable, twisted pair, wireless, etc.) between the correspondents within the network.

One or more portions of the computer system 12 may be distributed across one or more computer systems coupled to a communications network. This computer system 12 also may be general-purpose computer system. The computer system 12 may be in the form of any kind of general processing structure, and may for example include any device, such as, a personal computer, laptop, tablet, computer server, personal digital assistant (PDA), cellular phone, smartphone. For example, various aspects of the invention may be distributed among one or more computer systems (e.g., servers) configured to provide a service to one or more client computers, or to perform an overall task as part of a distributed system. For example, various aspects of the invention may be performed on a client-server, hybrid client-server, or multi-tier system that includes components distributed among one or more server systems that perform various functions according to various embodiments of the invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises," "comprising," or any other variations thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

The preceding detailed description of exemplary embodiments of the invention makes reference to the accompanying drawings, which show the exemplary embodiment by way of illustration. While these exemplary embodiments are described in sufficient detail to enable those skilled in the art to practice the invention, it should be understood that other embodiments may be realized and that logical and mechanical changes may be made without departing from the spirit and scope of the invention. For example, the steps recited in any of the method or process claims may be executed in any order and are not limited to the order presented. Further, the present invention may be practiced using one or more servers, as necessary. Thus, the preceding detailed description is presented for purposes of illustration only and not of limitation, and the scope of the invention is defined by the preceding description, and with respect to the attached claims.

The invention claimed is:

1. A sign comprising:
   a substrate having a planar sign face and an opposing planar back face having peripheral side edges;
   a recessed portion formed within said substrate having an opening and a bottom, and side walls;
   a RFID tag assembly having a metal shielding sheet, said RFID tag assembly having a mounting substrate, a double-sided adhesive sheet with one side adhered to a metal shielding sheet and an opposing side adhered to said bottom of said recessed portion;
   a retroreflective sheeting having a double-sided pressure-sensitive adhesive sheeting for application over said RFID tag assembly to hermetically seal said RFID tag assembly within said recessed portion;
   a translucent vinyl backed material with primary indicia applied to said retroreflective sheeting;
   wherein said RFID tag assembly comprises an RFID tag comprising at least one of a unique tag ID and a unique sign ID data;
   wherein said RFID tag is interrogated by an RFID reader to acquire at least one of said unique tag ID and unique sign ID data; and wherein at least one of said unique tag ID and unique sign ID data is received by a sign compliance management unit, and associated with said attribute data; and
   wherein said recessed portion comprises a communications interface module coupled to at least one of said sign compliance management unit and another sign.

2. The sign of claim 1, wherein said sign comprises sensors for acquiring measurements associated with a condition of said sign, and said data acquired by said sensors is transmitted to at least one of said sign compliance management unit and another sign.

3. The sign of claim 2, wherein said sign is a traffic control device, and wherein said attribute data comprises at least one of installation date, sign type, dimensions, substrate material, grade and manufacturer of reflective sheeting, manufacturer's name, batch number, manufacturer's certificate of conformity with government specifications, material grade, date of delivery, date of use and Material Data Sheet (MDS), location, jurisdiction, Manual of Uniform Traffic Control Devices (MUTCD) Code, face direction, sign face condition assessment, inspection date, reason for critical rating, last inspection dates and results, recent maintenance events, next scheduled inspection/maintenance, and post type.

4. A sign comprising:
   a substrate having a planar sign face and an opposing planar back face having peripheral side edges;
   a recessed portion formed within said substrate;
   contained within said recessed portion at least one of a RFID tag assembly, an accelerometer; a global positioning system (GPS) sensor; processing circuitry comprising, a microprocessor and a non-transitory computer readable medium, a communications interface module with a transceiver for emitting radio signals, and for receiving radio signals, and a power unit;
   a retroreflective sheeting for application over said recessed portion; and
   a translucent vinyl backed material with primary indicia applied to said retroreflective sheeting;
   wherein said processing circuitry comprises a compliance module to determine the condition of said sign based on at least one of RFID data, accelerometer data and sensor data and sign attribute data in said non-transitory computer readable medium.

5. The sign of claim 4, wherein said sign transmits said at least one of RFID tag data, accelerometer data, GPS sensor data, and sign attribute data via said transceiver to a computing system for determination of said sign's condition.

6. The sign of claim 4, wherein said compliance module comprises instructions stored in memory and executable by a processing structure to cause said processing structure to at least:
   determine an age of said sign;
   determine the condition of said sign based on predetermined criteria and maintenance data; and
   establish a compliance risk assessment for said sign based on regulatory requirements.

7. The sign of claim 6, wherein said based on said compliance risk assessment, said compliance module generates a recommendation and/or action to be taken to comply with said predetermined requirements for said sign.

8. The sign of claim 7, wherein said attribute data comprises at least one of installation date, sign type, dimensions, substrate material, grade and manufacturer of reflective sheeting, manufacturer's name, batch number, manufacturer's certificate of conformity with government specifications, material grade, date of delivery, date of use and Material Data Sheet (MDS), location, jurisdiction, Manual of Uniform Traffic Control Devices Code.

* * * * *